US012764406B2

(12) United States Patent
Haku et al.

(10) Patent No.: US 12,764,406 B2
(45) Date of Patent: Oct. 13, 2026

(54) APPARATUS FOR CAPTURING IMAGE OF HAND WORK

(71) Applicant: AQUA-FIELD CO., LTD., Osaka (JP)

(72) Inventors: Nobuaki Haku, Osaka (JP); Keisuke Yamaoka, Osaka (JP)

(73) Assignee: AQUA-FIELD CO., LTD., Osaka (JP)

( * ) Notice: Subject to any disclaimer, the term of this patent is extended or adjusted under 35 U.S.C. 154(b) by 21 days.

(21) Appl. No.: 18/863,934

(22) PCT Filed: Dec. 8, 2023

(86) PCT No.: PCT/JP2023/043933

§ 371 (c)(1),
(2) Date: Nov. 7, 2024

(87) PCT Pub. No.: WO2024/128144

PCT Pub. Date: Jun. 20, 2024

(65) Prior Publication Data

US 2025/0310626 A1 Oct. 2, 2025

(30) Foreign Application Priority Data

Dec. 16, 2022 (JP) ................................ 2022-201160

(51) Int. Cl.
*H04N 23/56* (2023.01)
*H04N 23/51* (2023.01)

(52) U.S. Cl.
CPC ............ *H04N 23/56* (2023.01); *H04N 23/51* (2023.01)

(58) Field of Classification Search
CPC ........ H04N 23/56; H04N 23/51; H04N 23/50; G03B 15/07; G03B 17/561
See application file for complete search history.

(56) References Cited

U.S. PATENT DOCUMENTS 11,573,481 B1 * 2/2023 Bolin .................. G03B 17/561
2002/0127008 A1 9/2002 Saigo et al.
(Continued)

FOREIGN PATENT DOCUMENTS

AU 2003213324 A1 9/2003
CN 106292132 A 1/2017
(Continued)

OTHER PUBLICATIONS

Office action issued in corresponding Taiwanese patent application No. 112147833, dated Oct. 21, 2025.
(Continued)

*Primary Examiner* — Mekonnen D Dagnew

(74) *Attorney, Agent, or Firm* — Greer Burns & Crain Ltd.

(57) ABSTRACT

An apparatus for capturing an image of a hand work, the apparatus including: a box part surrounding a work area in which an operator performs the hand work; and one or a plurality of illumination parts disposed in the box part. The box part includes: a wall part surrounding both lateral sides and a depth side of the work area and defining a work opening on a near side that provides communication between the inside and the outside of the work area, a top plate disposed on an upper part of the wall part and covering over the work area; and an image capturing device installation part capable of installing an image capturing device for capturing an image of the work area thereon.

5 Claims, 10 Drawing Sheets

(56) References Cited

U.S. PATENT DOCUMENTS

| | | | | |
|---|---|---|---|---|
| 2003/0206735 | A1 | 11/2003 | Saigo et al. | |
| 2021/0093414 | A1* | 4/2021 | Moore ................ | H04N 13/332 |
| 2022/0197117 | A1 | 6/2022 | Wang | |
| 2022/0397809 | A1 | 12/2022 | Talpade et al. | |

FOREIGN PATENT DOCUMENTS

| | | | |
|---|---|---|---|
| CN | 206339819 | U | 7/2017 |
| CN | 213517835 | U | 6/2021 |
| CN | 215067671 | U | 12/2021 |
| CN | 217404704 | U | 9/2022 |
| DE | 102011000071 | A1 | 7/2012 |
| JP | 2002135638 | A | 5/2002 |
| JP | 2003230036 | A | 8/2003 |
| JP | 2003271946 | A | 9/2003 |
| JP | 2005072977 | A | 3/2005 |
| JP | 2007158395 | A | 6/2007 |
| JP | 2008211850 | A | 9/2008 |
| JP | 2020173400 | A | 10/2020 |
| JP | 2022149888 | A | 10/2022 |
| TW | M352056 | U | 3/2009 |
| TW | M475611 | U | 4/2014 |
| WO | 0144868 | A1 | 6/2001 |

OTHER PUBLICATIONS

IPR issued in PCT/JP2023/043933, issued Jun. 26, 2025.

Youtube [online], [video], Feb. 5, 2020, [retrieved on Jan. 4, 2024], Internet: < URL: https://youtube.corn/ watch? v=rdUKz_Z6uWs>, 10:47-12:10, non-official translation ("Convenient shooting box. Made directly with Hy Akkin materials)' Also great for shooting hands-on videos!").

Office action issued in German patent application No. 11 2023 002 268.2, dated Aug. 31, 2025.

Office action issued in Japanese patent application No. 2022-201160, dated Jan. 4, 2024.

ISR issued in PCT/JP2023/043933, mailed Jan. 16, 2024.

Notice of Allowance issued in Japanese patent application No. 2024-054076, dated Jun. 10, 2024.

Notice of Allowance issued in Japanese patent application No. 2024-054077, dated Oct. 1, 2024.

Notice of Allowance issued in Japanese patent application No. 2022-201160, dated Mar. 4, 2024.

Office action issued in Japanese patent application No. 2024-054076, dated Jun. 10, 2024.

Office action issued in Japanese patent application No. 2024-054077, dated Jun. 10, 2024.

* cited by examiner

APPARATUS FOR CAPTURING IMAGE OF HAND WORK

CROSS-REFERENCE TO RELATED APPLICATION

The present application claims priority to Japanese Patent Application No. 2022-201160, the disclosure of which is incorporated herein by reference in their entirety.

FIELD

The present invention relates to an apparatus for capturing an image of a hand work for capturing an image of a worker's hand work.

BACKGROUND

An image capturing kit described in Patent Literature 1 is known as a conventional image capturing apparatus for capturing an image of an object. The image capturing kit includes an image capturing box having a box shape in which an image capturing space is formed, and an object-placement part on which an object is placed. The image capturing box includes a bottom plate, side plates, a top plate, and a reflector plate formed into a box shape, and is configured to block light entering the image capturing space through the image capturing box except the reflector plate. An image capturing hole in communication between the inside and the outside of the image capturing space is formed in the top plate.

According to the image capturing kit as above, an image of the object can be captured through the image capturing hole of the top plate by placing the object on the object-placement part to position the same in the image capturing space. According to this Patent Literature, the entry of the external light into the image capturing space is limited, and thus it is possible to efficiently acquire external environmental light in the image capturing space by the reflector plate, while preventing the reflection of reflected light and a shade of a photographer, so that the object can be finely taken.

CITATION LIST

Patent Literature

Patent Literature 1: JP 2020-173400 A

SUMMARY

Technical Problem

There is sometimes a demand for image capturing a worker's hands during a work as an object. However, according to the image capturing kit of Patent Literature 1, the image capturing box is configured to block light entering the image capturing space from the outside in order to prevent the reflection of reflected light or the like, and therefore it was impossible to capture an image of works performed by placing the hands in the image capturing space.

It is therefore an object of the present invention to provide an apparatus for capturing an image of a hand work that is capable of capturing an image of a hand work.

Solution to Problem

An apparatus for capturing an image of a hand work of the present invention includes: a box part surrounding a work area in which an operator performs the hand work; and an illumination part disposed in the box part, in which the box part includes: a wall part surrounding both lateral sides and a depth side of the work area and defining a work opening on a near side that provides communication between the inside and the outside of the work area; a top plate disposed on an upper part of the wall part and covering an upper part of the work area; and an image capturing device installation part capable of installing an image capturing device for capturing an image of the work area thereon.

DESCRIPTION OF EMBODIMENTS

An apparatus for capturing an image of a hand work 1 according to an embodiment of the present invention and a method for producing a hand work image will be described with reference to FIG. 1 to FIG. 10. For the sake of convenience, a vertical direction, a right-left direction, and a depth direction are described based on the directions in a state where the apparatus for capturing the image of the hand work 1 is installed.

The image capturing apparatus 1 is, for example, an apparatus for capturing the image of the worker's hand work which is performed in a work area S1, i.e., a certain range of a hand working area such as on a work table D. The hand work herein means all the work performed by a worker using the hands. The description hereinafter will be made by taking, for example, the case where a picture is drawn on a drawing medium (i.e., white board B) having a drawing area B1 for drawing a picture on its upper surface. The image capturing apparatus 1 according to this embodiment is used for capturing an image from above (i.e., capturing by bird's-eye imaging).

Figure 1:
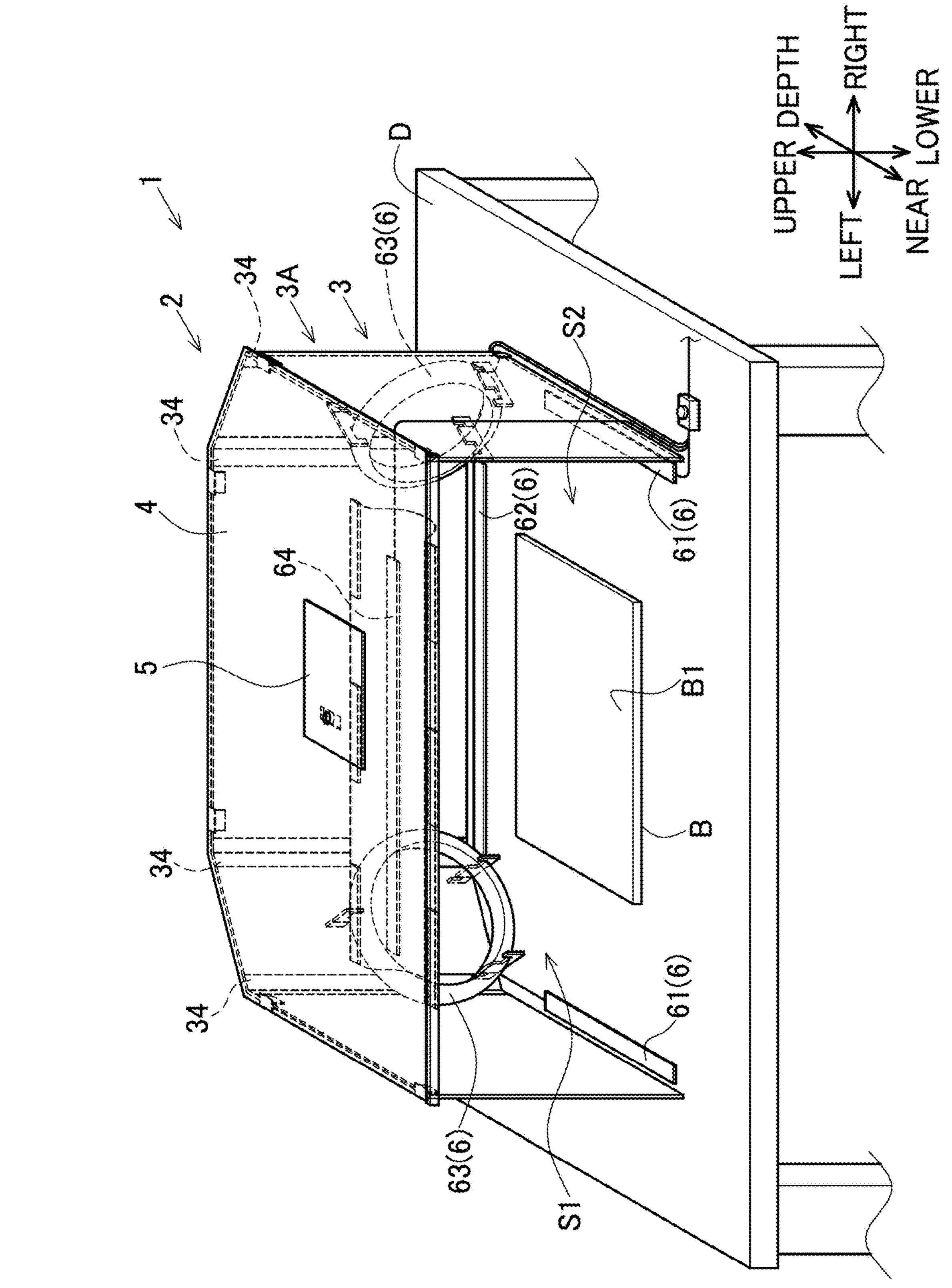
FIG. 1 is a perspective view showing an apparatus for capturing an image of a hand work according to an embodiment of the present invention.

As shown in FIG. 1, the image capturing apparatus 1 includes a box part 2 disposed on the work table D and illumination parts 6 disposed in the box part 2.

The box part 2 is a box-shaped body formed by a plurality of plate-shaped bodies combined together having an opening on a near side. Specifically, the box part 2 includes a wall part 3 surrounding left and right sides (i.e., both lateral sides) and a depth side of the work area S1 and defining a work opening S2 on the near side that provides communication between the inside and the outside of the work area S1, and a top plate 4 disposed on an upper part 3*b* of the wall part 3 and covering over the work area S1. The box part 2 further includes an image capturing device installation part 5 on which an image capturing device 7 for capturing an image of the hand work is installed. The box part 2 of this embodiment has an inner surface and an outer surface both in non-glossy white color, and is configured to prevent external light from entering the inside (i.e., work area S1) of the box part 2, while irregularly reflecting light emitted by the illumination parts 6 disposed in the box part 2 in the box part 2.

Figure 2:
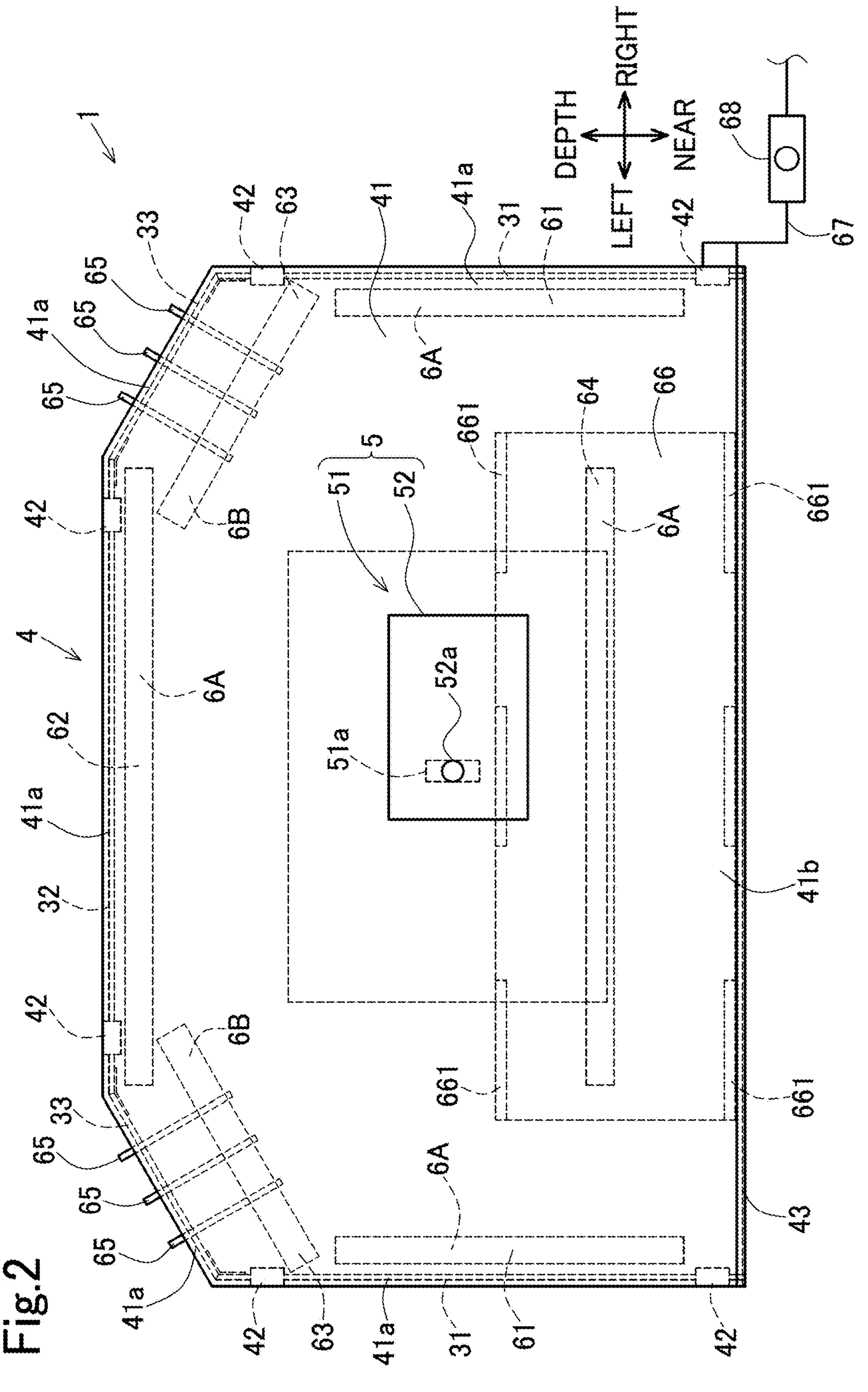
FIG. 2 is a plan view showing the apparatus for capturing the image of the hand work.
Figure 3:
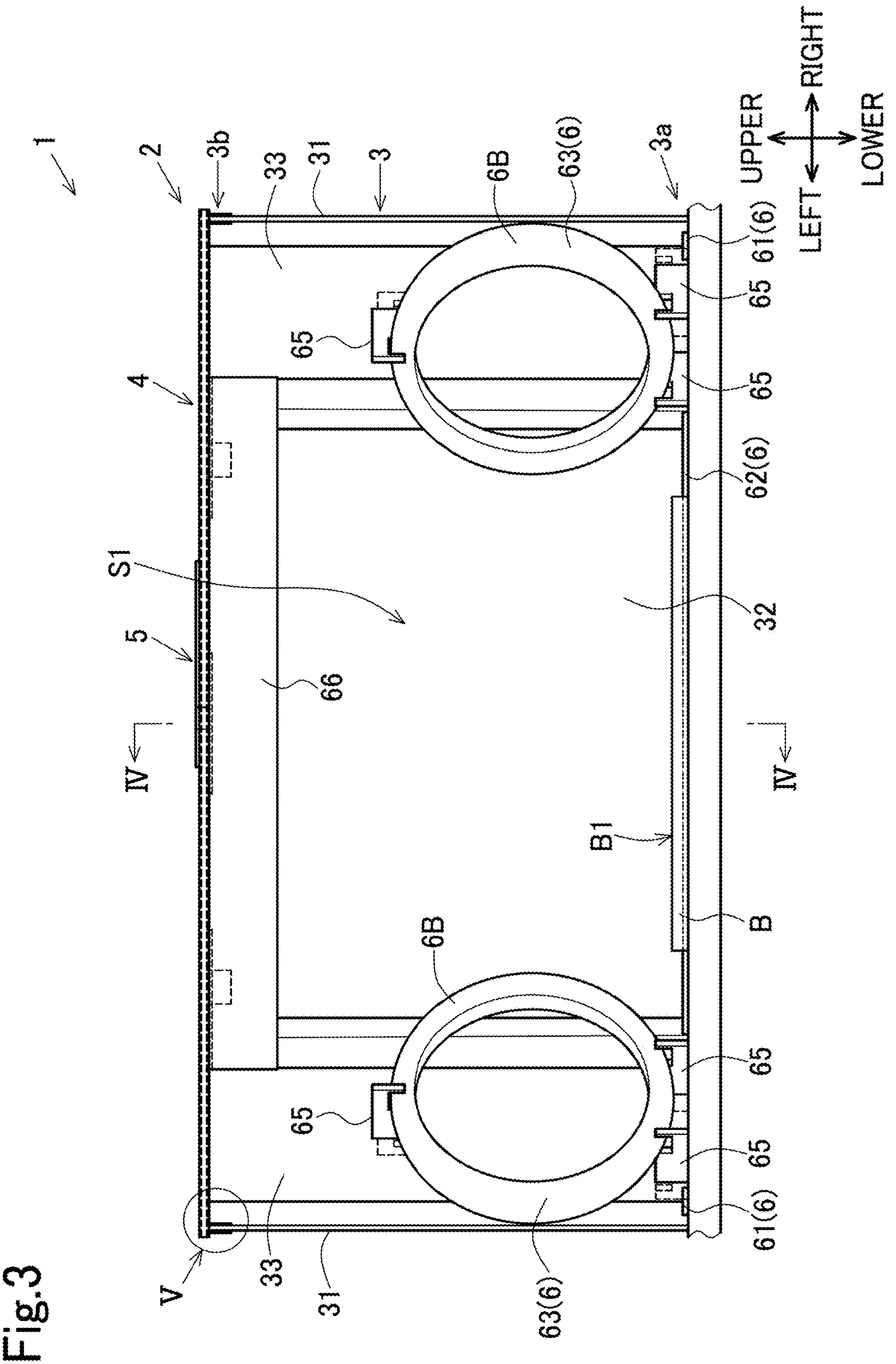
FIG. 3 is a front view of the apparatus for capturing the image of the hand work.

As shown in FIG. 2 and FIG. 3, the wall part 3 includes a pair of side walls 31 covering the left and right sides of the work area S1, a back wall 32 covering the back side of the work area S1, and coupling walls 33 for coupling the pair of side walls 31 and the back wall 32. Each of the side walls 31, the back wall 32, and the coupling walls 33 is a plate-shaped body and constitutes the wall part 3 with the adjacent plates coupled together. The wall part 3 has a substantially U-shape in plan view with the both lateral sides and the back side closed and the front side opened, and includes a bottom part 3*a* in contact with the work table D and the upper part 3*b* on which the top plate 4 is installed. The wall part 3 has a length in the right-left direction longer than the depth, specifically, about 2 times longer than the depth.

Figure 5:
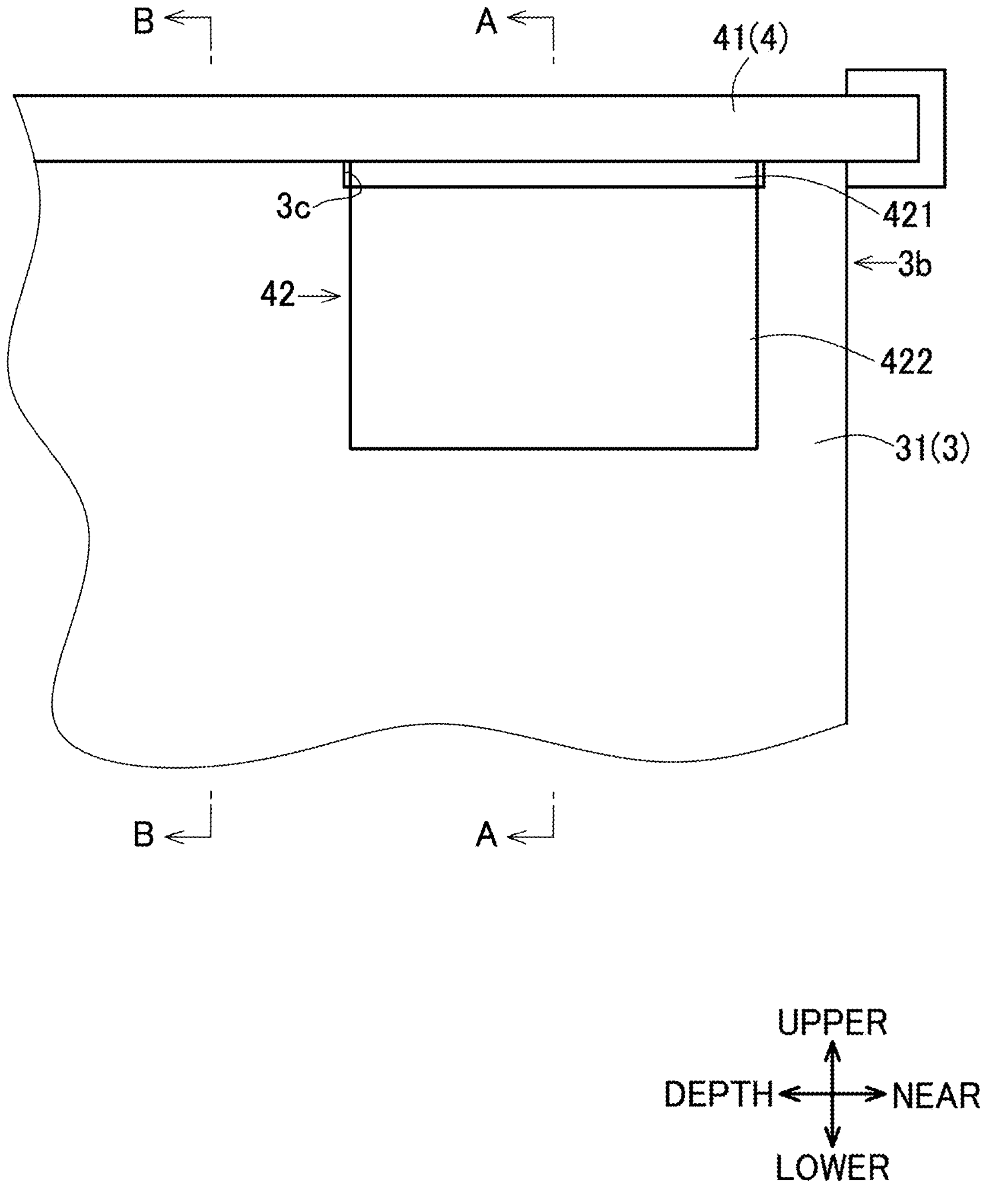
FIG. 5 is a side view of the apparatus for capturing the image of the hand work.

As shown in FIG. 5, a plurality of top plate installation cutouts 3*c* are formed in the plate-shaped body of the wall part 3 to extend downward from the upper part 3*b*. The downward length of the top plate installation cutout 3*c* is substantially the same as the vertical length (i.e., thickness) of a top plate attachment part 421 of a top plate coupler 42 that will be described later. The top plate installation cutouts 3*c* are located at the positions corresponding to the top plate coupling parts 42 of the top plate 4 to be mounted.

As shown in FIG. 2 and FIG. 3, the back wall 32 is a substantially rectangular plate-shaped body having long sides and short sides, and disposed to have a long side direction coinciding with the right-left direction, a short side direction coinciding with the vertical direction, and a thickness direction coinciding with the depth direction.

The side wall 31 is a substantially rectangular plate-shaped body having long sides and short sides. A pair of side walls 31 are disposed opposite to each other in the right-left direction. Each of the side walls 31 is disposed to have a long side direction coinciding with the depth direction, the short side direction coinciding with the vertical direction, and the thickness direction coinciding with the right-left direction.

Figure 7:
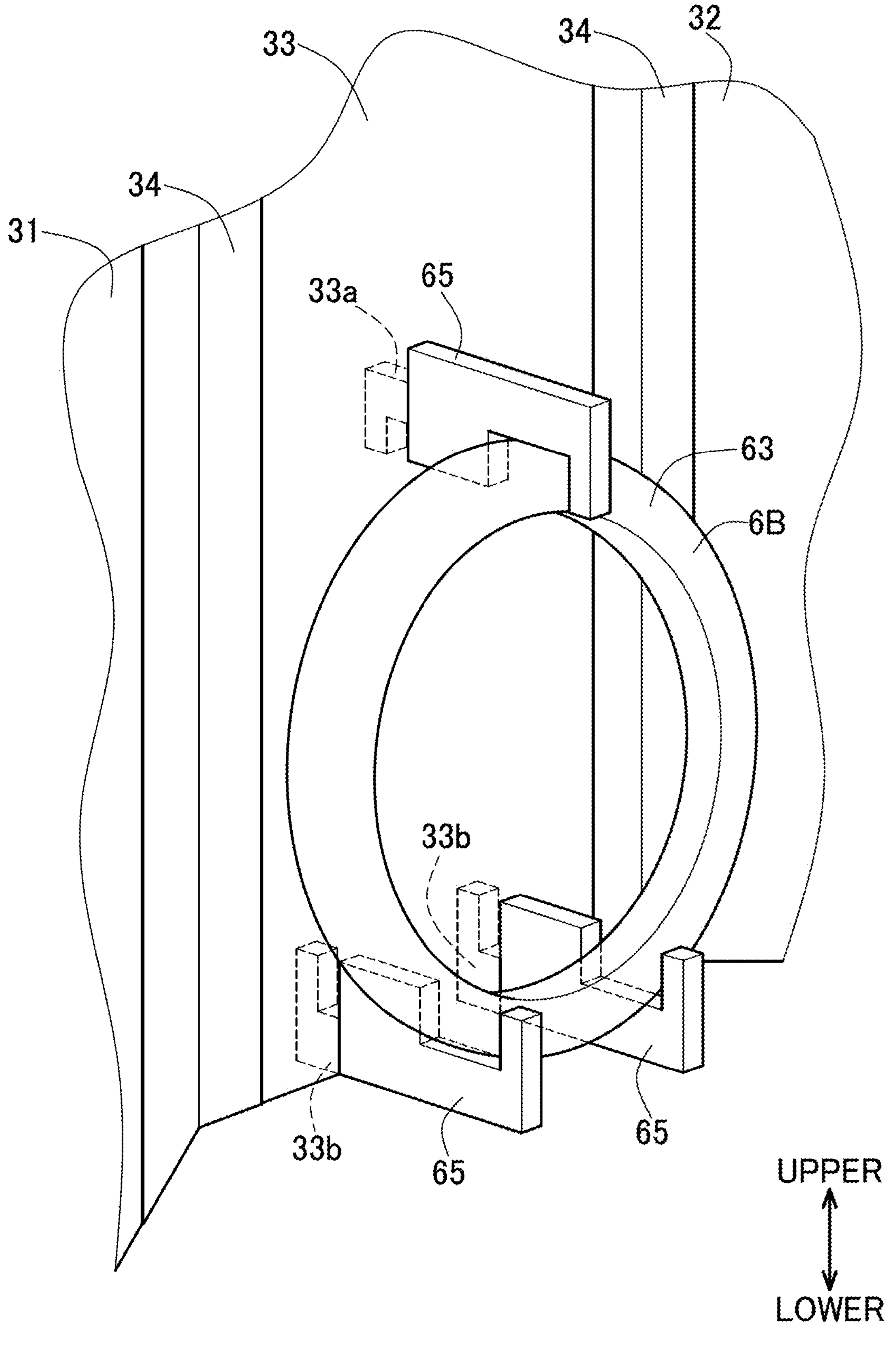
FIG. 7 is a view showing a coupling wall and a coupling-part illumination part of the apparatus for capturing the image of the hand work.

As shown in FIG. 2, FIG. 3, and FIG. 7, the coupling wall 33 is a substantially rectangular plate-shaped body having long sides and short sides and disposed between the back wall 32 and each of the side walls 31. Specifically, a pair of coupling walls 33 are provided. One coupling wall 33 is disposed to have a long side direction coinciding with the vertical direction, and one end in the short side direction coupled with a left end of the back wall 32, and another end in the short side direction coupled with an end on the depth side of the side wall 31 disposed on the left side. The other coupling wall 33 is disposed to have a long side direction coinciding with the vertical direction, one end in the short side direction coupled with a right end of the back wall 32, and another end in the short side direction coupled with an end on the depth side of the side wall 31 that is disposed on the right side.

As shown in FIG. 7, a plurality of cutouts are formed in each of the coupling walls 33, which extend therethrough in the thickness direction. Specifically, a lower cutout 33*b* is formed to extend upward from the bottom part 3*a*, and an upper cutout 33*a* is formed at a middle part in the vertical direction, in each of the coupling walls 33. In this embodiment, the lower cutouts 33*b* are formed at two positions distant from each other in the short side direction of each of the coupling walls 33, and the upper cutout 33*a* is formed at a position between both of the lower cutouts 33*b* in the short side direction of each of the coupling walls 33.

Figure 10:
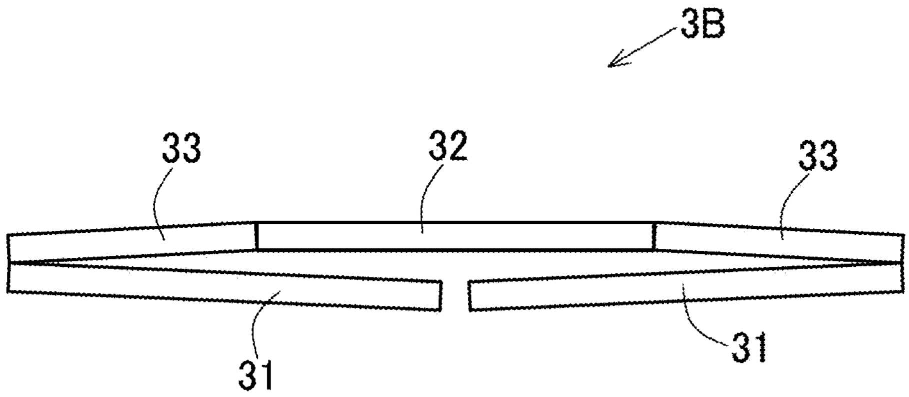
FIG. 10 is a view showing a state where a wall part of the apparatus for capturing the image of the hand work is folded.

As shown in FIG. 1, the adjacent plates in the wall part 3 are coupled by a tape 34 adhered to the inner surface, and can be switched between a developed state 3A as shown in FIG. 1 and a folded state 3B as shown in FIG. 10. The tape 34 of this embodiment is a bookbinding tape that has an adhesive surface disposed to face the inner surface of the wall part, and a surface opposed to the adhesive surface formed in non-glossy white color. A manner for folding the wall part 3 will be described later. In the inner surface of the wall part 3 in the developed state 3A, an angle formed by the back wall 32 and the coupling wall 33 and an angle formed by the coupling wall 33 and the side wall 31 are obtuse angles, specifically of 110 degrees or more and 170 degrees or less, preferably 115 degrees or more and 155 degrees or less. In the developed state 3A, the back wall 32, the coupling walls 33, and the side walls 31 are disposed to have their inner surfaces continuous with each other. The wall part 3 of this embodiment is provided with a cover member (not shown) for covering an outer surface of each of the coupled portions between the adjacent plates in the developed state 3A. The cover member is, for example, the same bookbinding tape as the tape 34 having an adhesive surface disposed to face the outer surface of the wall part 3.

As shown in FIG. 1 and FIG. 2, the top plate 4 includes a top plate body 41 having a plate shape, top plate couplers 42 for coupling the top plate body 41 with the wall part 3, and a reinforcing part 43 for reinforcing the top plate body 41. The top plate 4 further includes an image capturing device installation part 5.

As shown in FIG. 2, the top plate body 41 is a plate-shaped body disposed on the upper part 3*b* of the wall part 3 and covers over the work area S1. Specifically, the top plate body 41 is a plate-shaped body having an outer peripheral part in a shape conforming to the upper part 3*b* of the wall part 3, and disposed to have a thickness direction coinciding with the vertical direction. The top plate body 41 includes supported pieces 41*a* that are supported by the wall part 3 from below, and an opening-side piece 41*b* that defines the upper end of the work opening S2 in a state of being disposed on the upper part 3*b* of the wall part 3. In this embodiment, the opening-side piece 41*b* is a piece on the front side of the top plate body 41, and all the side pieces other than the opening-side piece 41*b* are the supported pieces 41*a*.

The reinforcing part 43 is a bar-shaped member which is more rigid than the top plate body 41, and is, specifically, a bar-shaped member made of metal formed into a linear shape and having a U-shape in cross section. The reinforcing part 43 is attached to the opening-side piece 41*b* to reinforce the opening-side piece 41*b* of the top plate body 41. Specifically, the reinforcing part 43 is configured to continuously extend from the left end to the right end of the top plate body 41 along the opening-side piece 41*b*, while being fitted into the opening-side piece 41*b* to suppress the opening-side piece 41*b* from being deformed by the rigidity of the reinforcing part 43. In this embodiment, the reinforcing part 43 is attached only to the opening-side piece 41*b* of the top plate body 41, and not attached to the supported pieces 41*a*.

Figure 6A:
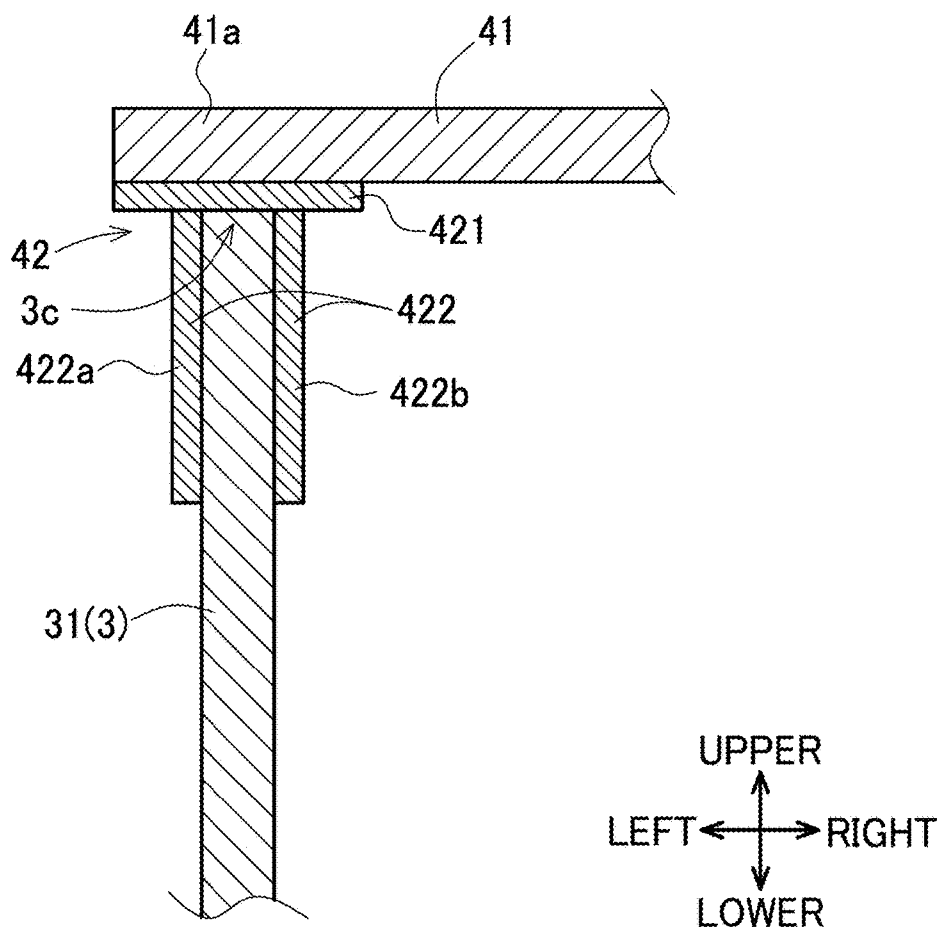
FIG. 6A is a cross-sectional view of the apparatus for capturing the image of the hand work taken along line A-A shown in FIG. 5.

As shown in FIG. 6(A), the top plate coupler 42 is a member for fixing the top plate body 41 to the upper part 3*b* of the wall part 3 by coupling. Specifically, the top plate coupler 42 includes a plate-shaped top plate attachment part 421 configured to be attached to a lower surface of the top plate body 41, and a wall engaging part configured to be engaged with the upper part 3*b* of the wall part 3. In this embodiment, the top plate attachment part 421 is fixed to the outer peripheral part of the lower surface of the top plate body 41. Specifically, the top plate attachment part 421 is fixed to the position at which a wall engaging part 422 can be engaged with the upper part 3*b* of the wall part 3 (i.e., top plate mounting cutout 3*c*) when the top plate body 41 is disposed on the wall part 3 in the developed state 3A. The wall engaging part 422 is a clip extending downward from the top plate attachment part 421 and holding the wall part 3 from both sides in the thickness direction. Specifically, the wall engaging part 422 includes an outer holding piece 422*a* disposed outside the wall part 3 in the thickness direction, and an inner holding piece 422*b* disposed inside the wall part 3 in the thickness direction, and is configured to hold the upper part 3*b* of the wall part 3 by these holding pieces to thereby engage with the wall part 3.

Figure 6B:
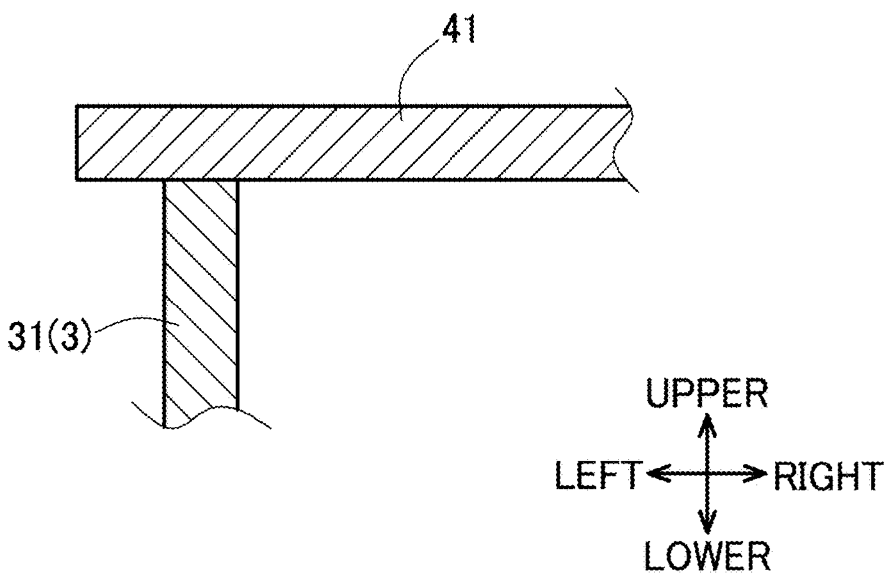
FIG. 6B is a cross-sectional view of the apparatus for capturing the image of the hand work taken along line B-B shown in FIG. 5.

As shown in FIG. 5, FIG. 6(A), and FIG. 6(B), the top plate attachment part 421 of the top plate coupler 42 which has come into engagement with the wall part 3 is in a state of being fitted into the top plate installation cutout 3*c*. In this embodiment, the width of the top plate installation cutout 3*c* extending downward is substantially the same as the thickness of the top plate attachment part 421, and thus the entire top plate attachment part 421 is fitted into the top plate installation cutout 3*c*. Therefore, the lower surface of the top plate 4 is prevented from lifting from the upper part 3*b* of the wall part 3 by an amount equivalent to the thickness of the top plate attachment part 421, so that the top plate 4 can be installed on the wall part 3 with the lower surface of the top plate 4 in contact with the wall part 3, as shown in FIG. 6(B).

Figure 9:
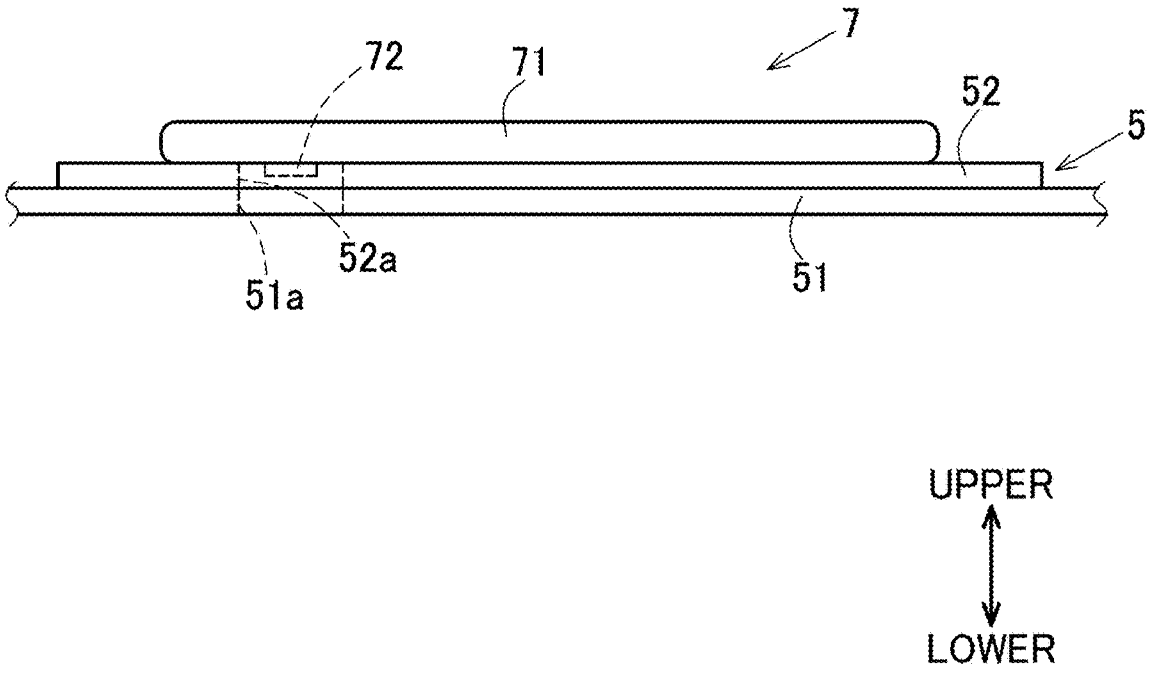
FIG. 9 is a view showing a state where an image capturing device is installed in the apparatus for capturing the image of the hand work.

As shown in FIG. 2 and FIG. 9, the image capturing device installation part 5 is a part on which the image capturing device 7 is installed, and supports the installed image capturing device 7. The image capturing device installation part 5 is located at a certain portion on the upper surface of the top plate body 41, specifically, located at a central portion. The image capturing device installation part 5 includes an image capturing hole 51*a* formed for allowing a lens 72 of the image capturing device 7 to project inside the box part 2, and a reflection suppressive device for suppressing the reflection of the image capturing device 7 by matching the image capturing hole 51*a* with the size of the lens 72. Specifically, the image capturing device installation part 5 includes an installation body part 51 on which the image capturing device 7 is installed, and an anti-reflective plate 52 as an anti-reflective device disposed between the installation body part 51 and the image capturing device 7 to be installed.

The installation body part 51 is a part of the top plate body 41, on which the image capturing device 7 is installed, specifically, a certain part of the upper surface of the top plate body 41. In the installation body part 51, the image capturing hole 51*a* extending through in the thickness direction of the top plate body 41 is formed. The image capturing hole 51*a* is a hole larger than the lens 72 of the image capturing device 7, and in this embodiment, a hole long in the depth direction.

The anti-reflective plate 52 is a plate-shaped body having a lower surface that faces the upper surface of the installation body part 51, and an upper surface on which the image capturing device 7 is directly mounted. The anti-reflective plate 52 is made of the same material as that of the top plate 4. The anti-reflective plate 52 has an adaptive hole 52*a* extending therethrough in the thickness direction. The adaptive hole 52*a* is a hole that has a size that is adaptable to the diameter of the lens 72 of the image capturing device 7, and that has a size substantially the same as or larger than the lens 72 of the image capturing device 7 and smaller than the image capturing hole 51*a*. The lower surface of the anti-reflective plate 52 is a non-glossy surface. The image capturing hole 51*a* and the adaptive hole 52*a* are disposed to overlap with each other in the vertical direction, and the anti-reflective plate 52 is disposed to cover an area of a peripheral part of the adaptive hole 52*a* not overlapping with the image capturing hole 51*a*.

As shown in FIG. 1 to FIG. 4, the illumination part 6 is disposed in the box part 2 and configured to emit light for illuminating the work area S1. In this embodiment, the illumination parts 6 are disposed at a plurality of locations in the box part 2. Further, light emitted by the illumination parts 6 in this embodiment is scattered, and the scattered light illuminates the work area S1. The illumination parts 6 include a pair of side illumination parts 61 disposed along the side walls 31, a far side illumination part 62 disposed along the back wall 32, a pair of coupling-part illumination parts 63 disposed along the coupling walls 33, and a top plate illumination part 64 disposed on the lower surface of the top plate 4. The illumination parts 6 are disposed outside the work area S1. The outside of the work area S1 herein means the outside of the area an image of which is captured by the image capturing device 7, and an area that is not a target to be captured by the image capturing device 7 installed on the image capturing device installation part 5 or an area to be removed after the capturing by, for example, trimming.

As shown in FIG. 2 and FIG. 3, the side illumination parts 61, the far side illumination part 62, and the top plate illumination part 64 each include a bar-shaped illumination body 6A having a linear light source. In the bar-shaped illumination body 6A, a plurality of light-emitting bodies (LED) are disposed in a linear fashion to form a linear light source. The coupling-part illumination parts 63 each have an annular illumination body 6B having an annular light source. In the annular illumination body 6B, a plurality of light-emitting bodies are annularly arranged to form an annular light source. Further, a hole extending in an axis direction of the coupling-part illumination part 63 is formed at a central portion of the annular illumination body 6B.

As shown in FIG. 2, the side illumination parts 61 are respectively disposed on the upper surface of the work table D and on inner sides of the side walls 31 (i.e., on the right side of the left side wall 31, on the left side of the right side wall 31) with reference to the box part 2 so that a light source extends along the lower end (i.e., in the depth direction) of each of the side walls 31. The side illumination parts 61 are disposed to have the light axis of each of the light-emitting bodies faces the top plate 4, and in this embodiment, disposed to have the light axis extending along the vertical direction. The upper surface of the side illumination part 61 is disposed at such a height as that the shadow cast by itself does not extend over the work area S1. In this embodiment, the upper surface of the side illumination part 61 is located at a lower position than the upper surface (i.e., drawing area B1) of the white board B (i.e., drawing medium) (see FIG. 4).

The far side illumination part 62 is disposed on the upper surface of the work table D, and on the inner side (i.e., on the near side) of the back wall 32 with reference to the box part 2, with a light source extending along the lower end of the back wall 32 (extending in the right-left direction). The far side illumination part 62 is disposed to have an optical axis facing the top plate 4, and in this embodiment, have an optical axis of each of light-emitting bodies extending in the vertical direction. The top side of the far side illumination part 62 is set at such a height as that the illumination part's own shadow is not cast over the work area S1. In this embodiment, the top side of the far side illumination part 62 is located lower than the top side of the white board B (see FIG. 4).

As shown in FIG. 2 and FIG. 7, each of the coupling-part illumination parts 63 is disposed inside the coupling wall 33 with reference to the box part 2, with a light source extending along the lower end of the coupling wall 33. The coupling-part illumination part 63 is disposed to have an optical axis of each of the light-emitting bodies facing the inner surface of the coupling wall 33, and in this embodiment, disposed to have an optical axis extending in a direction substantially orthogonal to the inner surface of the coupling wall 33. The coupling-part illumination part 63 of this embodiment is attached to the coupling wall 33 by an illumination part attachment fitting 65 that will be described later.

Figure 8A:
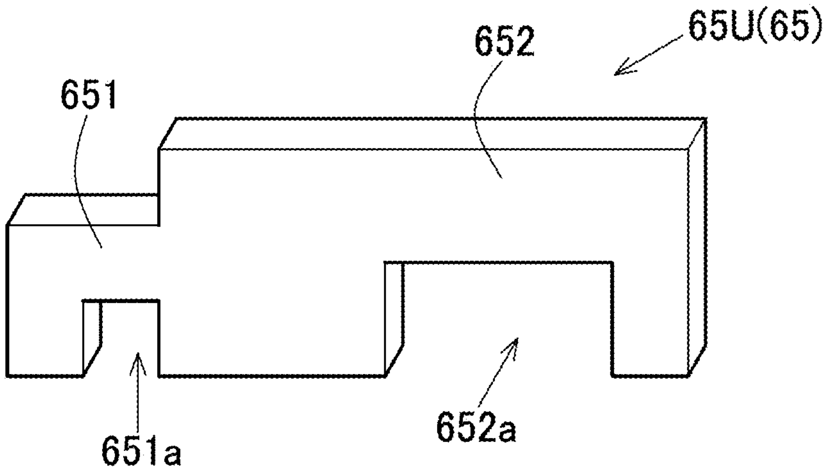
FIG. 8A is a view showing an upper attachment fitting that is an illumination part attachment fitting of the apparatus for capturing the image of the hand work.
Figure 8B:
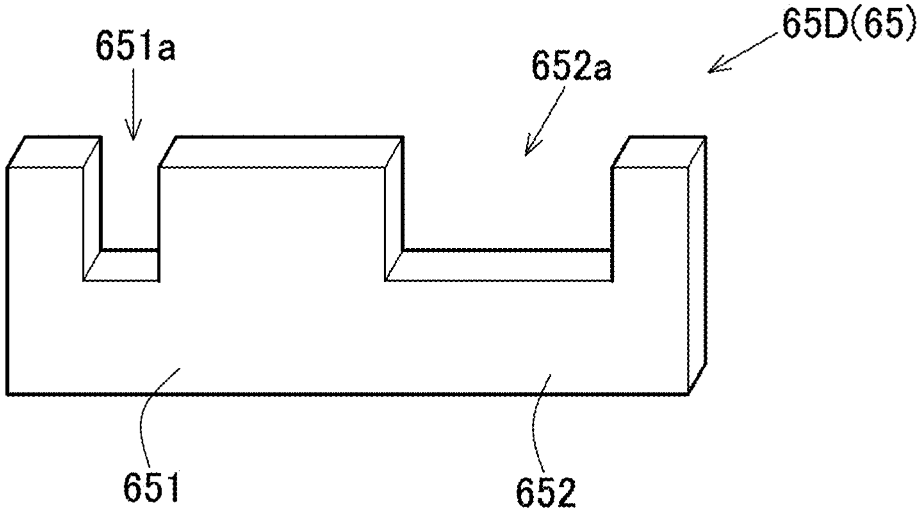
FIG. 8B is a view showing a lower attachment fitting that is an illumination part attachment fitting of the apparatus for capturing the image of the hand work.

As shown in FIG. 8(*a*) and FIG. 8(*b*), the illumination part attachment fitting 65 is a member that is engageable with the coupling wall 33 to hold the coupling-part illumination part 63 in the engaging state. Specifically, the illumination part attachment fitting 65 includes a wall attachment fitting member 651 configured to engage with a cutout formed in the coupling wall 33, and a light holding part 652 for holding the coupling-part illumination part 63. The wall attachment fitting part 651 is configured to fitted to the cutout formed in the coupling wall 33, thereby coming into engagement with the coupling wall 33. Specifically, a fitting cutout 651*a* for fitting to the cutout formed in the coupling wall 33 is formed in the wall attachment part 651. Further, a holding cutout 652*a*, to which the coupling-part illumination part 63 fits, is formed in the light holding part 652. The coupling-part illumination part 63 fits to the holding cutout 652*a* to enable the light holding part 652 to hold the coupling-part illumination part 63. Moreover, the illumination part attachment fitting 65 has a translucency. Specifically, the entire illumination part attachment fitting 65 is colorless transparent.

As shown in FIG. 7, the illumination part attachment fitting 65 includes an upper attachment fitting 65U configured to engage with the upper cutout 33*a* of the coupling wall 33 to support the coupling-part illumination part 63 from above, and a lower attachment fitting 65D configured to engage with the lower cutout 33*b* of the coupling wall 33 to support the coupling-part illumination part 63 from below. One upper attachment fitting 65U and two lower attachment fittings 65D are provided in this embodiment. Further, each of the lower attachment fittings 65D has a bottom surface being flat, the entirety of which is in contact with the upper surface of the work table D, while engaging with the lower cutout 33*b*.

Figure 4:
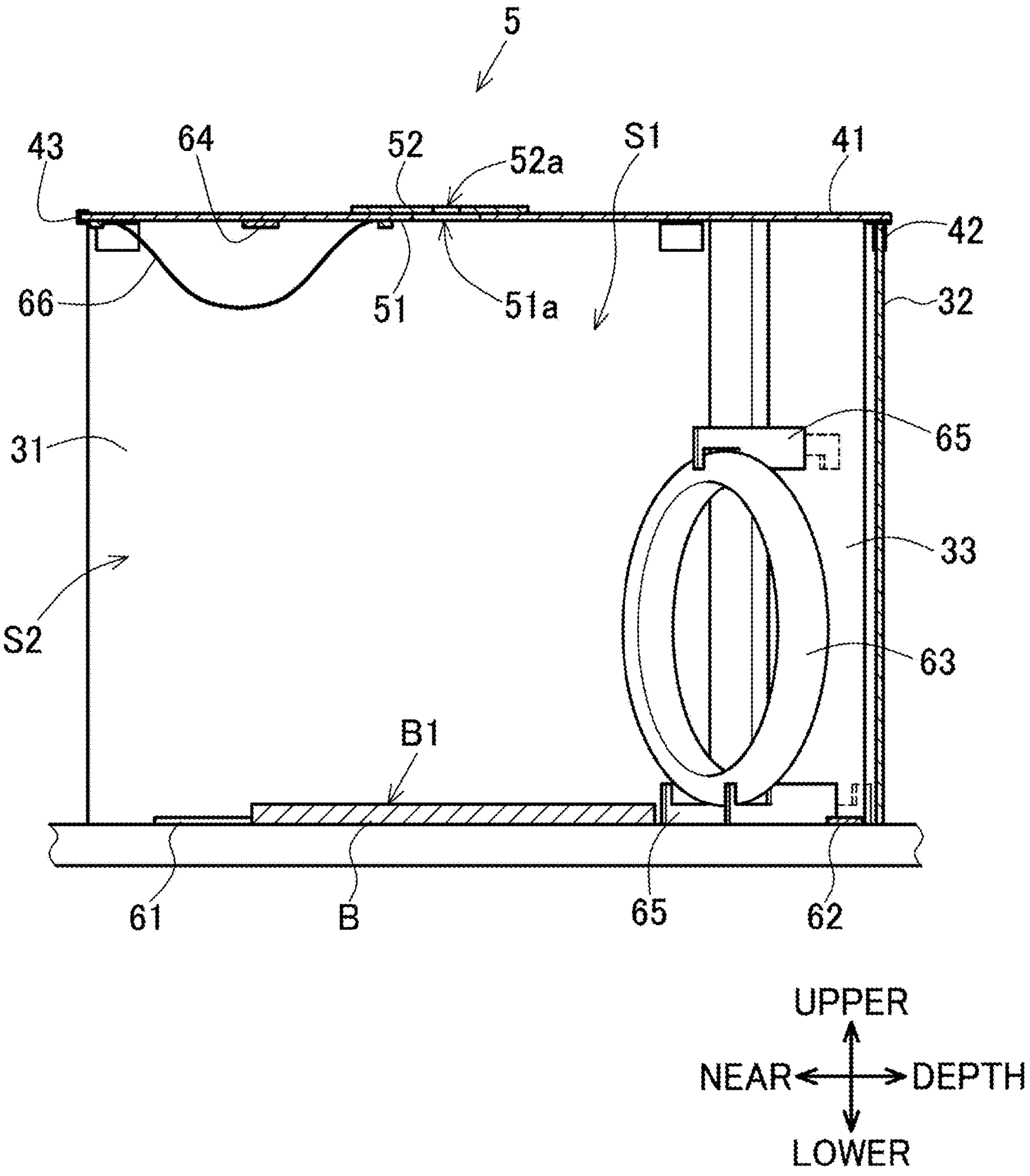
FIG. 4 is a cross-sectional view taken along line IV-IV shown in FIG. 3.

As shown in FIG. 2 and FIG. 4, the top plate illumination part 64 is one of the illumination parts 6 disposed on a lower surface of the top plate 4 and disposed to extend in the right-left direction. Further, the top plate illumination part 64 is disposed at a position on the near side of the image capturing device installation part 5. Specifically, the top plate illumination part 64 includes the bar-shaped illumination body 6A disposed on the lower surface of the top plate 4, and a light scattering device 66 for scattering light emitted by the bar-shaped illumination body 6A. The bar-shaped illumination body 6A of the top plate illumination part 64 is disposed to have an optical axis of each of light-emitting bodies facing downward. The bar-shaped illumination body 6A of the top plate illumination part 64 of this embodiment is fixed to the lower surface of the top plate body 41.

The light scattering device 66 is a sheet body disposed on the lower surface of the top plate 4 so as to cover the bar-shaped illumination body 6A of the top plate illumination part 64, and in this embodiment, is a white thin fabric detachably attached to the lower surface of the top plate 4. The light scattering device 66 allows light emitted by the bar-shaped illumination body 6A to scatter, while pass therethrough in the thickness direction. That is, light emitted by the bar-shaped illumination body 6A of the top plate illumination part 64 is scattered when passing through the light scattering device 66. The light scattering device 66 of this embodiment is attached to the top plate body 41 by a fabric attachment device 661. The fabric attachment device 661 is a magnetic body that can be attached to a magnet previously disposed on the top plate 4 and holds the light scattering device 66 between the fabric attachment device 661 and the magnet previously disposed on the top plate 4. The light scattering device 66 of this embodiment has a curved shape convex downward and is attached to the top plate body 41. The light scattering device 66 can be formed of, for example, a milky-white synthetic resin (such as an acrylic resin or plastic). Even with this configuration, the light passing therethrough can be scattered.

As shown in FIG. 2, power for emitting light is supplied from an external power supply (specifically, commercial power supply) to the illumination parts 6 of this embodiment. In this embodiment, a conductive wire 67 for supplying power to the illumination parts 6 is installed to extend from the work opening S2 to the inside of the box part 2. Further, the illumination parts 6 of this embodiment are connected with a dimmer 68 and configured to adjust the intensity of light by operating the dimmer 68. Without limitation thereto, the configuration can be such that each of the illumination parts 6 has a built-in power source and thus eliminates the necessity of the conductive wire 67. Alternatively, a cutout or cutouts can be formed on the lower end of the side walls 31, which pass through the side walls 31 in the thickness direction, to thereby have a conductive wire 67 disposed for supplying the power from outside of the box part 2 to each of the illumination parts 6 via the cutout or cutouts.

Light emitted by the aforementioned illumination parts 6 is scattered, and the scattered light illuminates the work area S1. Specifically, light emitted by the side illumination parts 61 and the far side illumination part 62 is reflected on the lower surface of the top plate 4 and the inner surface of the wall part 3, and the reflected light illuminates the work area S1. The lower surface of the top plate 4 and the inner surface of the wall part 3 being in non-glossy (surfaces having such unevenness to allow the reflected light to be irregularly reflected) allow light to be irregularly reflected when light is reflected on the lower surface of the top plate 4 and the inner surface of the wall part 3, and light is scattered as a result. Light emitted by the coupling-part illumination part 63 is reflected on the inner surface of the wall part 3, and the reflected light illuminates the work area S1. Similarly, the inner surface of the wall part 3 being in non-glossy allows light to be irregularly reflected when the light is reflected on the inner surface of the wall part 3, and light is scattered as a result. Further, a configuration of a hole formed in a central portion of the coupling-part illumination part 63 allows the reflected light to pass through the hole to illuminate the work area S1. In this manner, light emitted by each of the illumination parts 6 is reflected inside of the box part 2 to illuminate the work area S1, and thus the work area S1 is entirely illuminated from the inner surface of the box part 2. Therefore, the entire work area S1 is evenly illuminated. Further, light emitted by the top plate illumination part 64 passes through the light scattering device 66, and light that has passed therethrough illuminates the work area S1. Here, the light scattering device 66 allows light passing therethrough to be scattered, and thus light that has been scattered illuminates the work area S1 as a result.

As shown in FIG. 9, the image capturing device 7 is a device that can capture an image of the work area S1, and specifically, a camera or a terminal with a built-in camera. The image capturing device 7 of this embodiment can capture both a moving image and a still image, but can capture either the moving image or the still image. Specifically, the image capturing device 7 includes an image capturing body 71 having a box shape, and a lens 72 disposed in the image capturing body 71, and is configured such that the image capturing body 71 allows light (i.e., image) having passed through the lens 72 to be digitally or analogically recorded in a memory medium.

The image capturing device 7 is installed on the image capturing device installation part 5. Specifically, the image capturing device 7 is disposed to have the lens 72 overlapped with the adaptive hole 52*a* in the vertical direction on the upper part of the anti-reflective plate 52 that is disposed to allow the adaptive hole 52*a* to communicate with the image capturing hole 51*a* of the installation body part 51. For adjusting the position of the image capturing device 7 relative to the top plate 4, the positions of the adaptive hole 52*a* and the lens 72 relative to the image capturing hole 51*a* are adjusted by moving the anti-reflective plate 52 together with the image capturing device 7. Thereby, the position of the image capturing device 7 relative to the top plate 4 can be adjusted. In the case where the lens 72 and the image capturing hole 51*a* match with each other in size, the image capturing device 7 can be directly installed on the installation body part 51 without using the anti-reflective plate 52. In such a case, the entire image capturing hole 51*a* can be closed by the lens 72, which can suppress the reflection of the image capturing device 7.

A method for producing a hand work image using the image capturing apparatus 1 having the above configuration will be described.

First, for a preliminary stage, the image capturing apparatus 1 is installed on the work table D. The installation of the image capturing apparatus 1 on the work table D is performed by 3 steps of a wall part developing step, a top plate mounting step, and an illumination part arranging step.

In the wall part developing step, the wall part 3 in the folded state 3B as shown in FIG. 10 is mounted on the work table D to turn into the developed state 3A as shown in FIG. 1 to surround the work area S1. The arrangement of the wall part 3 at this stage is a temporary arrangement, and the final arrangement is performed in the top plate mounting step.

In the top plate mounting step, the top plate 4 is mounted on the upper part 3*b* of the wall part 3 in the developed state 3A. Specifically, in the top plate mounting step, the top plate body 41 is disposed on the upper part 3*b* of the wall part 3 to cover over the work area S1, while the wall engaging parts 422 of the top plate couplers 42 are engaged with the upper part 3*b* of the wall part 3 to thereby couple the top plate 4 and the wall part 3. Here, since the top plate couplers 42 are disposed to engage with the wall part 3 in the developed state 3A, the wall part 3 is simultaneously positioned at the time of the engagement of the wall engaging part 422 with the wall part 3, and the pair of side walls 31 of the wall part 3 are opposed to each other in the right-left direction and the back wall 32 is disposed to extend in a direction orthogonal to the both side walls 31. By the above steps, the installation of the box part 2 on the work table D is finished.

The illumination part arranging step is a step of arranging the illumination parts 6 in the box part 2. Specifically, the side illumination parts 61 are disposed along the pair of side walls 31 and the far side illumination part 62 is disposed along the back wall 32. Further, the illumination part attachment fittings 65 are attached to the coupling wall 33 to allow the illumination part attachment fittings 65 to hold the coupling-part illumination part 63, to thereby arrange the coupling-part illumination parts 63. Since the top plate illumination part 64 is previously fixed to the top plate body 41 in this embodiment, the arrangement of the top plate illumination part 64 is finished when the top plate 4 is disposed on the wall part 3. Subsequently, the illumination part arranging step is finished by wiring to supply power to each of the illumination parts. By the above steps, the installation of the image capturing apparatus 1 on the work table D is finished.

Next, a hand work image is produced by capturing a hand work image using the image capturing apparatus 1. In this embodiment, the description will be given on the case where an image as the hand work image is produced by bird's-eye imaging of drawing work of drawing a picture on a drawing medium (i.e., white board B) having a drawing area B1 on its upper surface. Prior to producing an image of hand work, the illumination parts 6 of the image capturing apparatus 1 are turned on, and the white board B as the drawing medium is positioned on the work area S1, while the image capturing device 7 is installed on the image capturing device installation part 5. When the image capturing device 7 is installed on the image capturing device installation part 5, the position of the image capturing device 7 relative to the top plate 4 is adjusted as appropriate.

Next, a user performs hand work by putting his or her hands from the work opening S2 into the work area S1, while capturing an image of the work area S1 by the image capturing device 7. In this embodiment, a moving image of hand work of drawing a picture or letter on a drawing medium is captured by the image capturing device 7. That is, an image of a picture or letter itself drawn on a drawing medium is not captured, but an image of a process of drawing a painting or letter (i.e., process of the hand work) is captured. The work opening S2 is kept open during the capturing of an image of the work area S1 by the image capturing device 7.

Since the work opening S2 is kept open, light emitted by the illumination parts 6 escapes from the work opening S2 to the outside of the box part 2. In this embodiment, however, the top plate illumination part 64 is provided on the near side of the image capturing device installation part 5, and thus the top plate illumination part 64 supplements a quantity of light escaping from the work opening S2. Therefore, it is possible to suppress the work area S1 on the near side from darkening even when capturing the image of the work area S1 with the work opening S2 kept open.

Then, the image capturing body 71 stores the image of the captured hand work in the memory medium. Thereby, the capturing (production) of the image of the hand work is finished. In this embodiment, the image of the hand work is stored in the memory medium provided inside the image capturing device 7, but the configuration can be such that the image is stored in an external memory medium (such as a memory card or an external server).

After the image capturing is finished, the image capturing apparatus 1 is removed from the work table D and then stored with the wall part 3 folded. When the wall part 3 is folded in this embodiment, the inner surfaces of the back wall 32 and the coupling walls 33 are extended straight, and then the side walls 31 are folded to have the inner surfaces of the side walls 31 overlapped with the inner surfaces of the back wall 32 and the coupling walls 33. In this embodiment, the wall part 3 is folded with the bookbinding tape as the cover member (not shown), and the tape 34, kept attached to the wall part 3.

According to the image capturing apparatus 1 having the above configuration, when the work is performed by putting the hands from the work opening S2, it is possible to capture an image of the hands and their surrounding areas, while illuminating them by the illumination parts 6. Therefore, it is possible to capture an image of the hands and their surrounding areas illuminated by the illumination parts 6, while suppressing the reflection of external light and the like by the wall part 3 and the top plate 4 which surround the work area S1. The wall part 3 and the top plate 4 can have any configurations as long as the reflection of the external light and the like can be suppressed. For example, it is possible to employ a configuration such that external light is allowed to pass through them while being scattered to such a degree as to cause no influence on the image capturing or a configuration such that external light is fully blocked.

Further, since the work area S1 in a range covering both the lateral sides and the far side can be illuminated, the occurrence of uneven brightness in the work area S1 can be suppressed. Therefore, an image of the hand work can be finely captured.

Moreover, since the top plate illumination part 64 is disposed on the near side of the image capturing device installation part 5, the hands and their surrounding areas can be illuminated during the hand work by the top plate illumination part 64. Therefore, an image of the hands and their surrounding areas can be finely captured.

Further, since the coupling-part illumination parts 63 are provided along the coupling walls 33, the work area S1 can be illuminated from the corners on the far side. Thereby, it is possible to suppress the corners of the work area S1 from darkening, and thus finely capture an image of the hand work.

Moreover, since the coupling-part illumination parts 63 can be attached to the coupling walls 33 via the illumination part attachment fittings 65 to thereby allow the illumination part attachment fittings 65 to be disposed at positions close to the coupling walls 33, it is possible to suppress possible shadows of the illumination part attachment fittings 65, which may occur, from causing reflection in the captured image. Therefore, an image of the hand work can be finely captured.

Further, since the top plate body 41 is supported by the wall part 3 from below and reinforced by the reinforcing part 43, even if the top plate body 4 is applied with a load, it is possible to suppress the top plate body 41 from being bent downward by the load.

Moreover, each illumination part 6 (i.e., a light source formed of an illuminant assembly structure) is configured to extend continuously in a plane direction of the top plate 4. This configuration enables to irradiate uniform light compared with the configuration that the illumination parts 6 (i.e. light sources) are located at different positions.

Further, the side illumination parts 61 and the far side illumination part 62 are provided to have their light axes facing the top plate 4. This configuration enables to uniformly illuminate the entire work area S1 by light reflecting on the top plate 4.

Moreover, the light sources of the side illumination parts 61 and the far side illumination part 62 are disposed below the drawing area B1 (i.e., upper surface) of the drawing medium. This configuration enables to suppress the drawing area B1 from being directly applied with light emitted by the illumination parts 6, thereby suppressing the reflection of the light parts 6.

Further, the top plate illumination part 64 is provided to have the light axes surrounding the work table D. This configuration can surely illuminate the hands and the surrounding areas during the hand work, thereby enabling capturing an image.

Moreover, the top plate illumination part 64 includes the light source and the light scattering device 66 for scattering light emitted by the light source. Therefore, even when the top plate illumination part 64 emits light toward the work table D, the light is scattered and thus the reflection of the top plate illumination part 64 can be suppressed. Accordingly, securing of brightness and suppression of the reflection of light of the illumination parts 6 can be simultaneously realized.

Further, since the illumination part attachment fittings 65 is transparent, it is possible to suppress generation of shadow by the illumination part attachment fittings 65.

Moreover, the image capturing device installation part 5 includes, on the upper surface of the top plate body 41, the installation body part 51 on which the image capturing device 7 is installed, and the image capturing hole 51*a* extending in the thickness direction is formed in the installation body part 51. With this configuration, an image is captured by placing the image capturing device 7 on the top plate body 41, which makes it possible to easily capture an image. Further, an image of the work area S1 is captured through the image capturing hole 51*a*, which makes it possible to suppress an object from looking distorted. Thereby, it is possible to easily and finely capture an image of the hand work. Particularly, according to the above configuration, the strength of the top plate body 41 may be reduced as a result of the formation of the image capturing hole 51*a*, but the top plate body 41 can be reinforced by the reinforcing part 43, which makes it possible to suppress the top plate body 4 from being distorted by the weight of the image capturing device 7.

Further, the image capturing device installation part 5 includes the anti-reflective plate 52 that has a plate shape and includes the adaptive hole 52*a* extending in the thickness direction. The adaptive hole 52*a* is a hole smaller than the image capturing hole 51*a*, and the anti-reflective plate 52 is disposed between the installation body part 51 and the image capturing device 7 to communicate the lens 72 of the image capturing device 7 with the image capturing hole 51*a* via the adaptive hole 52*a*. Thereby, the amount of the image capturing device 7 exposed to the work area S1 can be suppressed by the anti-reflective plate 52, and thus the reflection caused by reflecting the image capturing device 7 on the work table D and the like can be suppressed. Further, the lower surface of the anti-reflective plate 52 that is a non-glossy surface allows light emitted by the illumination parts 6 to be irregularly reflected on the lower surface of the anti-reflective plate 52, thereby illuminating the work area S1 by the reflected light. Accordingly, it is possible to suppress the work area S1 from darkening due to light escaping from the image capturing hole 51*a* to the outside of the box part 2.

Moreover, light emitted by the illumination parts 6 is scattered to illuminate the work area S1. Since the work area S1 thus illuminated by the scattered light can be suppressed from being locally applied with strong light, the entire work area S1 can be uniformly illuminated. In particular, light emitted by each of the side illumination parts 61, the far side illumination part 62, and the coupling-part illumination parts 63 is scattered while being reflected on the inner surface of the wall part 3 and the lower surface of the top plate 4, and thus it is possible to illuminate the entire work area S1 from the entire inner surface of the wall part 3.

Further, since the angle formed by the adjacent inner surfaces of the wall part 3 is an obtuse angle, light even at the boundary of the adjacent inner surfaces of the wall part 3 can be reflected toward the work area S1, which makes it possible to illuminate the work area S1 by reflected light. Accordingly, it is possible to suppress the work area S1 from locally darkening.

According to the aforementioned method for producing the image of the hand work, it is possible to capture an image of the hand work while illuminating the hands and the like during the hand work, when the hands are put through the work opening S2. Therefore, it is possible to capture an image of the hand work while illuminating the hands and their surrounding areas by the illumination parts 6, while suppressing the reflection of external light and the like by the wall part 3 and the top plate 4 which surround the work area S1.

Although the embodiment of the present invention has been described above for example, the present invention is not limited to the aforementioned embodiment and various modifications can be made without departing from the gist of the present invention.

The description was made by taking, for example, the case where light emitted by the illumination parts 6 is scattered to illuminate the work area S1, but the configuration can be such that the work area S1 is illuminated with light emitted by the illumination parts 6 without scattering.

Further, the description was made by taking, for example, the case where the image capturing device 7 captures a moving image of the hand work, without limitation thereto. The configuration can be such that the image capturing device 7 captures still images of a process of the hand work based on the time lapse.

Moreover, the description was made by taking, for example, the case where the wall part 3 can be developed and folded, without limitation thereto. The configuration can be such that the wall part 3 is non-foldable. In the case where the wall part 3 is configured to be non-foldable, the wall part 3 can be composed of, for example, a single plate shaped body having a semicircular shape in plan view concave to the far side. Alternatively, the configuration can be such that the wall part 3 includes no coupling wall 33 to allow the side walls 31 to be directly coupled with the back wall 32.

Further, the box part 2 can be configured to include a bottom plate. In the case of employing such a configuration, the lower part of the work area S1 is covered with the bottom plate to thereby arrange the drawing medium on, for example, the upper surface of the bottom plate.

Moreover, the arrangement and the number of illumination parts 6 are not limited to the above examples. For example, the configuration without including one or some members out of the side illumination part 61, the far side illumination part 62, the coupling-part illumination part 63, and the top plate illumination part 64 can be employed, or the configuration including an additional illumination part 6 can be employed. Further, the configuration of the illumination parts 6 is not limited to the above configuration described for example. Although the description was made by taking, for example, the case where the coupling-part illumination part 63 has the annular illumination body 6B, the configuration can be such that the coupling-part illumination part 63 has a bar-shaped illumination body 6A having a bar shape.

Further, the description was made by taking, for example, the case where the wall attachment part 651 of the illumination part attachment fitting 65 is engaged with the cutout formed in the coupling wall 33, without limitation thereto. For example, the configuration can be such that the wall attachment part 651 of the illumination part attachment fitting 65 is attached to the coupling wall 33 with, for example, an adhesive.

Moreover, the description was made by taking, for example, the case where the reinforcing part 43 is a metal for fitting to the opening-side piece 41*b*, without limitation thereto. For example, the reinforcing part 43 can be configured as a wire to be embedded in the top plate body 41, or can be configured such that the edge of the top plate body 41 is folded to improve the rigidity. Further, the reinforcing part 43 can be mounted to any side piece (i.e., supported side piece 41*a*) other than the opening-side piece 41*b*. In the case of employing such a configuration, the strength of the top plate body 41 can be further improved. Moreover, in the case where the top plate body 41 is formed by a material having such a rigidity as not to be deformed even when the image capturing device 7 is mounted thereon, the configuration can be such that no reinforcing part 43 is included. Even in such a case, the reinforcing part 43 is preferably included in terms of preventing the deformation of the top plate body 41.

Further, the description was made by taking, for example, the case where the image capturing hole 51*a* is formed in the image capturing device installation part 5 to allow an image of the work area S1 in the box part 2 to be captured from the outside of the box part 2, without limitation thereto. For example, the configuration can be such that a part of the image capturing device installation part 5 is formed of a transparent material to allow an image of the work area S1 in the box part 2 to be captured from the outside of the box part 2.

Moreover, the description was made by taking, for example, the case where the image capturing device installation part 5 is provided on the top plate 4 and the work area S1 is captured by bird's-eye imaging, without limitation thereto. For example, the configuration can be such that the image capturing device installation part 5 is provided on the wall part 3 to capture an image of the work area S1 from any of the lateral sides or the far side. Even in the case where the image capturing device installation part 5 is provided on the top plate 4, the configuration can be such that, for example, the image capturing device 7 is installed on the lower part of the top plate 4.

Further, the description was made by taking, for example, the anti-reflective plate 52 as an anti-reflective device of the image capturing device installation part 5, without limitation thereto. For example, the configuration can be such that the size of the image capturing hole 51*a* is changeable to allow itself to conform with the size of the lens 72. Even in such a configuration, the reflection of the image capturing device 7 can be suppressed. Further, the configuration can be such that no anti-reflective device is included.

Moreover, the description was made by taking, for example, the work of drawing a picture or letter on a drawing medium as the hand work to be captured, without limitation thereto. For example, an image of any hand work such as cooking, sawing, or introducing accessories can be captured.

REFERENCE SIGNS LIST

1: Apparatus for capturing image of hand work
2: Box part
3: Wall part
31: Side wall
32: Back wall
33: Coupling wall
33*a*: Upper cutout
33*b*: Lower cutout
34: Tape
4: Top plate
41: Top plate body
41*a*: Supported side
41*b*: Opening-side piece
42: Top plate coupling part
421: Top plate attachment part
422: Wall engaging part
422*a*: Outer holding piece
422*b*: Inner holding piece
43: Reinforcing part
5: Image capturing device installation part
51: Installation body part
51*a*: Image capturing hole
52: Anti-reflective plate
52*a*: Adaptive hole
6: Illumination part
6A: Bar-shaped illumination body
6B: Annular illumination body
61: Side illumination part
62: Far side illumination part
63: Coupling-part illumination part
64: Top illumination part
65: Illumination part attachment fitting
65U: Upper attachment fitting
65D: Lower attachment fitting
651: Wall attachment part
651*a*: Fitting cutout
652: Light holding part
652*a*: Holding cutout
66: Light scattering device
661: Fabric attachment device
67: Conductive wire
68: Dimmer
7: Image capturing device
71: Image capturing body
72: Lens
B: White board
B1: Drawing area
D: Work table
S1: Work area
S2: Work opening

The invention claimed is:

1. An apparatus for capturing an image of a hand work, the apparatus comprising:

a box part surrounding a work area in which an operator performs the hand work; and an illumination part disposed in the box part, wherein the box part includes:

a wall part surrounding both lateral sides and a depth side of the work area as viewed from the operator, and defining a work opening on a near side that provides communication between the inside and the outside of the work area;

a top plate disposed on an upper part of the wall part and covering over the work area; and an image capturing device installation part capable of installing an image capturing device for capturing an image of the work area thereon, wherein the box part has a non-glossy inner surface, the wall part includes: a pair of side walls covering both the lateral sides of the work area; and a back wall covering a far side of the work area;

the illumination part includes a pair of side illumination parts disposed on inner sides of the side walls and disposed to extend along lower ends of the pair of side walls, and a far side illumination part disposed on the inner side of the back wall with reference to the box part; and the pair of side illumination parts and the far side illumination part each are disposed to have an optical axis facing the top plate.

2. The apparatus for capturing the image of the hand work according to claim 1, wherein the image capturing device installation part is disposed on the top plate, and the illumination part further has at least a top plate illumination part disposed on a lower surface of the top plate on a near side of the image capturing device installation part.

3. The apparatus for capturing the image of the hand work according to claim 1, wherein the top plate includes: a top plate body having a plate shape and supported by the wall part from below; and a reinforcing part, and the reinforcing part is configured to reinforce an opening-side piece of the top plate body, the reinforcing part defining an upper end of the work opening.

4. An apparatus for capturing an image of a hand work, the apparatus comprising:

a box part surrounding a work area in which an operator performs the hand work; and an illumination part disposed in the box part, wherein the box part includes:

a wall part surrounding both lateral sides and a depth side of the work area as viewed from the operator, and defining a work opening on a near side that provides communication between the inside and the outside of the work area;

a top plate disposed on an upper part of the wall part and covering over the work area; and an image capturing device installation part capable of installing an image capturing device for capturing an image of the work area thereon, wherein the box part has a non-glossy inner surface, the wall part includes: a pair of side walls covering both the lateral sides of the work area; a back wall covering the far side of the work area; one coupling wall coupling one of the pair of side walls with the back wall; and an-other coupling wall coupling the other one of the pair of side walls with the back wall, the illumination part further includes coupling-part illumination parts disposed to respectively extend along the one coupling wall and the other coupling wall, and each of the coupling-part illumination parts is disposed to have an optical axis facing the inner surface of the coupling wall.

5. The apparatus for capturing the image of the hand work according to claim 4, further comprising illumination part attachment fittings that have:

wall attachment parts respectively attachable to the one coupling wall and the other coupling wall; and light holding parts respectively holding the coupling-part illumination parts.

* * * * *